Patented Jan. 14, 1936

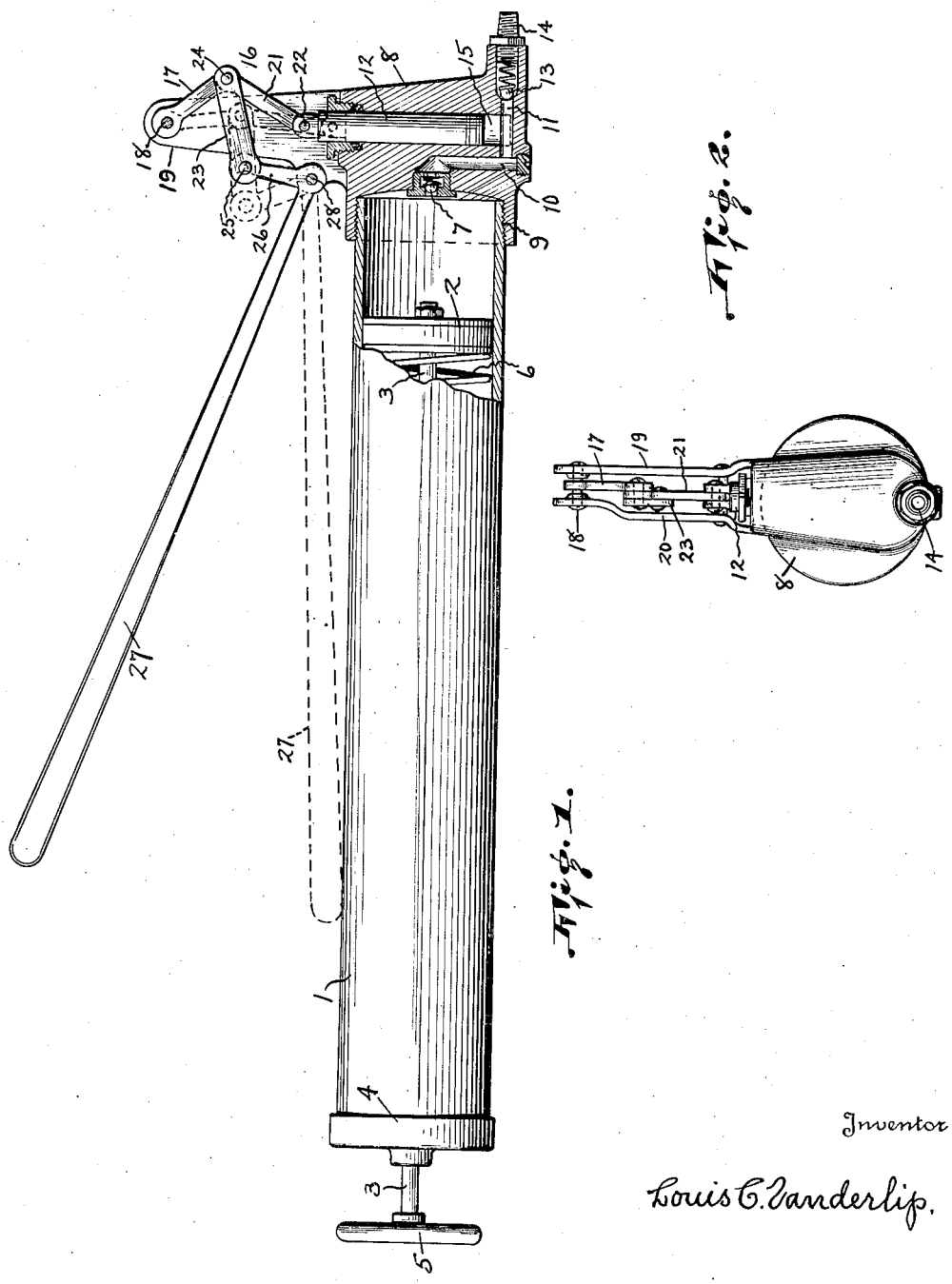

2,027,500

UNITED STATES PATENT OFFICE 2,027,500

GREASE GUN

Louis C. Vanderlip, Elkhart, Ind.

Application February 28, 1935, Serial No. 8,623

7 Claims. (Cl. 221—47.3)

This invention relates to lubricating devices, and particularly to devices for injecting grease, and other lubricants, into bearings under pressure.

The principal object of my invention is to provide a grease or lubricant injector, or gun, with improved and novel means incorporated therein for delivering lubricant, or grease, to a bearing at a very high pressure.

Another object of the invention is to provide a hand operated grease gun with toggle mechanism for actuating the grease ejector, or plunger, whereby grease is delivered to the bearing at a pressure greatly in excess of the pressure exerted by the type of hand gun now in common use.

Other and more specific objects of the invention are mentioned and described herein.

The invention is illustrated on the accompanying drawing, wherein

Figure 1 is a side elevational view, partly in section, illustrating a grease gun to which the invention is applied; and Figure 2 is an end elevational view thereof.

Similar numerals of reference indicate like parts throughout the two views on the drawing.

Referring to the details of the drawing the numeral 1 indicates the cylindrical grease container of a grease gun within which the usual spring pressed piston 2 is arranged, the latter of which may be provided with the piston retracting rod 3 which traverses the container 1 and the container head 4 and which may terminate exteriorly of the container with a handle 5 for manually retracting said piston, as is well known in the art. The numeral 6 indicates a coil spring arranged within the grease container 1 which is adapted to exert a pressure on the piston 2 to drive the grease, or lubricant, ahead of said piston toward the spring pressed ball outlet valve 7 which is suitably mounted in the head 8, also well known in the art. The container head 8 may be removably mounted on the end of the container 1 in any suitable manner as, for example, by screw threads 9 to enable manual filling of the container with grease.

The ball outlet valve 7 is adapted to place the interior of the container 1 in communication with the two head passages 10 and 11 when said valve is unseated by action of the cylindrical reciprocable grease ejector, or plunger, 12 to admit lubricant to said passages upon actuation of said plunger away from the passage 11, as is well known in the art. A second spring pressed ball valve 13 normally closes the outer end of the passage 11 and which is adapted to be unseated by the inward, or grease ejecting, movement of the plunger 12 to enable expulsion of grease, or lubricant, through the conventional tubular discharge stud 14, also well known in the art.

The reciprocable cylindrical plunger 12 operates in the usual bore 15 the lower end whereof is preferably in permanent communication with the intercommunicating passages 10 and 11. As is well known in this art the efficiency of a grease gun depends upon the force with which grease is expelled from the stud 14, or its equivalent element, and that force is exerted by the plunger 12 which, in the devices now in common use, is actuated by a simple lever, manually actuated, directly connected with the upper, or outer, end of the plunger 12 and which, on account of its direct connection, cannot actuate the plunger with the maximum force or power.

My improved mechanism for operating the plunger 12 comprises a toggle element 16 which has its upper link 17 pivotally mounted at 18 between the upper ends of a pair of toggle mounts, or posts, 19 and 20 which may be cast integral with the head element 8. The lower toggle link 21 is pivotally connected at 22 with the outer end of the plunger 12. To actuate the toggle 16 a link 23 has one end thereof operatively connected therewith at 24, the opposite end of said toggle actuating link being pivotally connected with the arm 26 at 25, said arm projecting angularly from the lower end of the manually operable lever 27 which is pivotally carried at 28 in the container head 8.

It will be evident to those skilled in this art and in engineering that the application of the toggle principle to a grease gun for actuating the grease expelling plunger will greatly enhance the force with which grease may be expelled and driven into a bearing, thereby materially increasing the efficiency of the hand operated type of grease gun.

I claim:

1. In a grease gun provided with a grease container, a discharge nozzle, and a reciprocable grease ejector for forcing grease from said nozzle, the combination of a toggle operatively carried by the grease gun, said toggle including a pair of pivotally connected links, one of said links being operatively connected with said grease ejector, and link and lever means operatively connected with said toggle for actuating the latter and thereby said grease ejector.

2. In a lubricant gun provided with a lubricant container, a discharge nozzle, and a reciprocable lubricant ejector adapted to force lubricant from said nozzle, the combination of a toggle operatively mounted upon the lubricant gun, said toggle including a pair of links pivotally connected together, one of said links being operatively connected with said lubricant ejector, a toggle actuating link connected with said toggle at the point of pivotal connection of the links thereof, and a lever operatively connected with said toggle actuating link for actuating said toggle and thereby said lubricant ejector.

3. In a grease gun provided with a grease container, a removable head carried thereby, and a reciprocable plunger in said head adapted to pump grease from said container and expel same from said head, the combination of a lever pivotally mounted on said container head, a toggle mount carried by said container head, a toggle carried by said toggle mount, one of the toggle links being connected with said plunger to actuate the latter upon toggle actuation, and a link connecting said toggle with said lever for actuating said toggle.

4. In a grease gun provided with a grease container, a removable head therefor, and a reciprocable plunger in said head adapted to expel grease from the gun, the combination of a lever pivotally mounted on said container head, a toggle mount rigidly mounted on said grease gun head, a toggle mounted upon said toggle mount, one of the toggle links being connected with said plunger to actuate the latter, and means operatively connecting said lever with said toggle for actuating the latter and thereby said plunger.

5. In a grease gun provided with a grease container, a removable head therefor, and a reciprocable plunger in said head adapted to pump grease from said container and expel same from said head, the combination of a lever pivotally mounted on said container head and provided with a lateral arm, a toggle operatively supported on said container head, one of the toggle links being extensible toward said plunger and connected therewith to actuate the latter, and a link operatively connecting said toggle with said lever arm for actuating said toggle.

6. In a grease gun, the combination of a grease container, a head therefor which is provided with grease intake and discharge passages, a reciprocable plunger mounted in said head and adapted to pump grease from said container into one of said passages and to expel it from the other, a pivotally mounted lever, a toggle mount rigidly connected with said container head, a toggle mounted upon said toggle mount, said toggle including a pair of links pivotally connected together, one of said links being pivotally carried by said mount and the other toggle link being operatively connected with said plunger, and link means operatively connecting said toggle with said lever for actuating said toggle and thereby said plunger.

7. In a grease gun, the combination of a grease container, a head therefor which is provided with grease intake and discharge passages, a reciprocable plunger mounted in said head and adapted to pump grease from said container into one of said passages and expel it from the other, a pivotally mounted lever carried by said container head, a toggle mount rigidly connected with said container head, a toggle mounted upon said toggle mount, said toggle including a pair of links pivotally connected together, one of said links being pivotally carried by said mount and the other toggle link being operatively connected with said plunger, and a toggle actuating link having one end thereof operatively connected with said toggle adjacent the point of pivotal connection of the links thereof, the other end of said actuating link being operatively connected with said lever.

LOUIS C. VANDERLIP.